United States Patent
Hultberg et al.

[11] Patent Number: 6,062,270
[45] Date of Patent: May 16, 2000

[54] DOUBLE-WALLED STRUCTURE IN A VENTILATION DUCT SYSTEM

[75] Inventors: Kent Hultberg, Bastad; Teuvo Ranta, Laholm; Hans Larsson, Helsingborg, all of Sweden

[73] Assignee: Lindab AB, Bastad, Sweden

[21] Appl. No.: 09/113,928

[22] Filed: Jul. 10, 1998

Related U.S. Application Data

[63] Continuation-in-part of application No. 08/788,246, Jan. 27, 1997, Pat. No. 5,801,342.

[51] Int. Cl.$^7$ .................................. F16L 11/00; F16L 9/14
[52] U.S. Cl. .......................... 138/129; 138/122; 138/143
[58] Field of Search ..................... 138/129, 143; 29/509; 181/36 B, 224

[56] References Cited

U.S. PATENT DOCUMENTS

| | | | |
|---|---|---|---|
| 1,643,008 | 9/1927 | Fentress . | |
| 2,937,436 | 5/1960 | Butler et al. | 29/419 |
| 3,474,514 | 10/1969 | Lombardi | 72/50 |
| 3,487,537 | 1/1970 | Lombardi | 29/477.7 |
| 3,694,892 | 10/1972 | Hale | 72/49 X |
| 3,903,928 | 9/1975 | Sykes et al. | 138/149 X |
| 3,974,013 | 8/1976 | Roos | 29/446 X |
| 3,981,378 | 9/1976 | Potter | 181/252 |
| 3,997,098 | 12/1976 | Van Petten | 29/890.048 |
| 4,034,826 | 7/1977 | Andrews | 181/36 |
| 4,160,312 | 7/1979 | Nyssen | 29/429 |
| 4,387,498 | 6/1983 | Morhard | 29/435 X |
| 4,823,579 | 4/1989 | Castricum | 72/49 |
| 5,162,622 | 11/1992 | Malmsten | 181/227 |
| 5,193,374 | 3/1993 | Castricum | 72/49 |
| 5,260,523 | 11/1993 | Pettersson et al. | 181/224 |
| 5,325,893 | 7/1994 | Takagi et al. | 138/143 |
| 5,461,777 | 10/1995 | Ikeda et al. | 29/890.08 |
| 5,479,706 | 1/1996 | Tamano et al. | 29/890.08 |
| 5,605,024 | 2/1997 | Sucato et al. | 52/696 |
| 5,670,756 | 9/1997 | Ohtaka et al. | 181/256 |
| 5,720,095 | 2/1998 | Lennartsson | 29/509 |
| 5,722,149 | 3/1998 | Le Sage et al. | 29/33 D |
| 5,737,832 | 4/1998 | Bubb | 29/781 |
| 5,795,634 | 8/1998 | Fukui | 138/129 |

FOREIGN PATENT DOCUMENTS

| | | |
|---|---|---|
| 546790 A1 | 6/1992 | European Pat. Off. . |
| 1146971 | 11/1957 | France . |
| 1307015 | 9/1962 | France . |
| 57-154314 | 9/1982 | Japan . |
| 58-58928 | 4/1983 | Japan . |
| 1211608 | 8/1989 | Japan . |
| C-509 330 | 1/1999 | Sweden .......... B21D 28/36 |
| 206768 | 8/1939 | Switzerland . |
| 652869 | 3/1979 | Switzerland . |
| 1574480 | 9/1980 | United Kingdom . |
| 2122256 | 1/1984 | United Kingdom . |
| WO 9407620 | 4/1994 | WIPO . |
| WO 97/09496 | 3/1997 | WIPO ................ E04C 3/09 |
| WO 98/17412 | 4/1998 | WIPO . |

*Primary Examiner*—Andres Kashnikow
*Assistant Examiner*—Davis Hwu
*Attorney, Agent, or Firm*—Weingarten, Schurgin, Gagnebin & Hayes LLP

[57] ABSTRACT

A double-walled structure in a ventilation duct system has an inner tube and an outer tube and, arranged therebetween, a sound-absorbing material. The inner tube is a helically-wound lock-seam tube formed from a sheet metal strip having parallel longitudinal areas of expanded metal.

15 Claims, 4 Drawing Sheets ns,801,342.

DOUBLE-WALLED STRUCTURE IN A VENTILATION DUCT SYSTEM

CROSS-REFERENCE TO RELATED APPLICATIONS

This application is a continuation-in-part of U.S. patent application Ser. No. 08/788,246, filed on Jan. 27, 1997, now U.S. Pat. No. 5,801,342.

FIELD OF THE INVENTION

The present invention relates to double-walled structures, such as silencers for use in ventilation duct systems. The invention also concerns the production of such double-walled structures. Further, the invention is related to the field of producing helically-wound lock-seam tubing, in particular for circular ventilation duct systems.

BACKGROUND OF THE INVENTION

Double-walled structures for use in ventilation duct systems are well known in the art. In a brochure entitled "LindabSilencer" printed in 1988 and distributed by Lindab Ltd., various double-walled silencers are disclosed. On p. 2 of this Lindab brochure, the general construction of such silencers is described. A typical Lindab silencer comprises an inner tube of perforated thin metal sheet and an outer tube or casing which typically is a helically-wound lock-seam tube of thin metal sheet. The space between the two tubes is filled with sound-absorbing material, such as mineral wool, of different types and densities depending on the field of use. Between the perforated inner tube and the sound-absorbing material, there is a thin fiber layer, the purpose of which is to prevent fibers from the sound-absorbing material from being drawn into the air duct defined by the inner tube. Without such fiber layer, there is a risk that suction forces in the air duct will draw the insulation material into the duct and thereby impair the sound-absorbing effect of the silencer.

Several examples of circular double-walled silencers are shown in the above-mentioned Lindab brochure. Most of these silencers have end pieces at each end which are provided with tubular portions for connection to circular ducts in the ventilation duct system. Other double-walled structures (not shown in the Lindab brochure) are provided with insulation material over their full length, in which case no end pieces are mounted.

For the sake of completeness, reference is also made to Japanese Patent Abstract No. 1,211,608, in which an additional silencer structure is disclosed. Further, British Patent Publication No. 2,122,256 is mentioned as background art, in which FIG. 3 shows still another silencer.

In the prior-art described above, the thin fiber layer for covering the perforated inner tube is provided in the following manner. First, a rectangular piece of fiber material taken from a web-like supply is cut in a first separate operation. The shape of the fiber material piece is adapted to the shape and circumference of the perforated inner tube. Second, the cut fiber material piece is swept about the perforated inner tube, and third the fiber piece is fastened thereon, for instance by means of adhesive. Again, these are separate operations.

The operations are time-consuming and are often carried out manually, which is disadvantageous. The unnecessarily complicated operations for applying the fiber layer increase the total cost of the double-walled structure. Thus, there is a need for providing a new type of double-walled structure which is produced in an improved way.

It is known to use an inner tube in the shape of a helically-wound tube, which can basically be produced in an apparatus of the type disclosed in French Patent Publication No. 1,307,015. The purpose of the apparatus disclosed in this French publication is to provide a helically-wound lock-seam tube covered by a plastic layer on its inside. The inner plastic cover is intended to prevent corrosion on the inside of the tube. Thus, a strip of plastic material is applied on that side of the metal strip which forms the inside of the tube before the strip is supplied to the forming head. In order to provide a continuous plastic cover on the inside of the tube, the apparatus is equipped with a special welding unit for welding the Joints of the helically formed plastic strip inside the tube.

In addition to the problems discussed above, designers of double-walled structures and silencers of the present type are interested in keeping material costs as low as possible. Further, experts on silencers of the kind described are always striving to enhance the sound-absorbing effect.

WO 98/17412 discloses a filter structure having a helically formed inner tube of expanded metal. However, this known structure is not adapted for use in ventilation duct systems and has no sound-absorbing effect.

As to prior art, U.S. Pat. No. 4,034,826 should be mentioned as well. Indeed, this patent discloses a ventilation duct silencer having an inner tube of expanded metal, but the inner tube is not helically formed.

SUMMARY OF THE INVENTION

An object of the invention is to eliminate the drawbacks mentioned above by providing an improved double-walled structure, in particular a silencer for a ventilation duct system.

A specific object of the invention is to provide a double-walled structure which can be produced with a reduced consumption of material and which has an enhanced sound-absorbing effect.

These objects are achieved by a double-walled structure in a ventilation duct system, comprising: an inner tube; an outer casing spaced from and enclosing the inner tube; and a sound-absorbing material provided between the inner tube and the casing; wherein the Inner tube is a helically-wound lock-seam tube formed from a sheet metal strip having at least one longitudinal area of expanded metal.

The above objects are also achieved by a double-walled silencer, comprising: an inner tube; an outer tube spaced from and enclosing the inner tube; a tubular space defined by the inner tube and the outer tube; and a sound-absorbing material provided in and filling up the space between the inner tube and the outer tube; wherein the inner tube is a helically-wound lock-seam tube formed from a sheet metal strip having at least one longitudinal area of expanded metal.

Further, the objects are achieved by the use of a sheet metal strip having at least one longitudinal area of expanded metal, for producing a helically-wound lock-seam tube to be used as an inner tube in a double-walled structure in a ventilation duct system, preferably a silencer.

The invention gives several advantages. Since the inner tube is formed from an expanded metal strip, material savings on the order of 10–20% can be achieved compared with conventional production. Scrap is kept at a minimum.

Further, it has surprisingly been found that the expanded metal areas have a favorable effect on the sound-absorbing function. In practical tests with ventilation duct silencers provided with expanded-metal inner tubes, it has been found that the sound-absorbing effect is enhanced by about 3–5 dB, at least in the frequency range 0–1000 Hz, compared with known silencers. This is very favourable, since it is most important to damp the sound in this range.

In an embodiment, the expanded-metal inner tube is covered with a fluid-permeable material.

Further advantages of the expanded-metal inner tube are that it has an improved stiffness and that the production of the tube is very effective.

The invention is applicable to many kinds of double-walled structures, such as long ventilation ducts which are provided with insulating material over their full length and which have no end pieces.

BRIEF DESCRIPTION OF THE DRAWINGS

The invention will now be described in more detail with reference to the accompanying schematic drawings which show preferred embodiments of the invention and in which.

DESCRIPTION OF PREFERRED EMBODIMENTS

Figure 1:
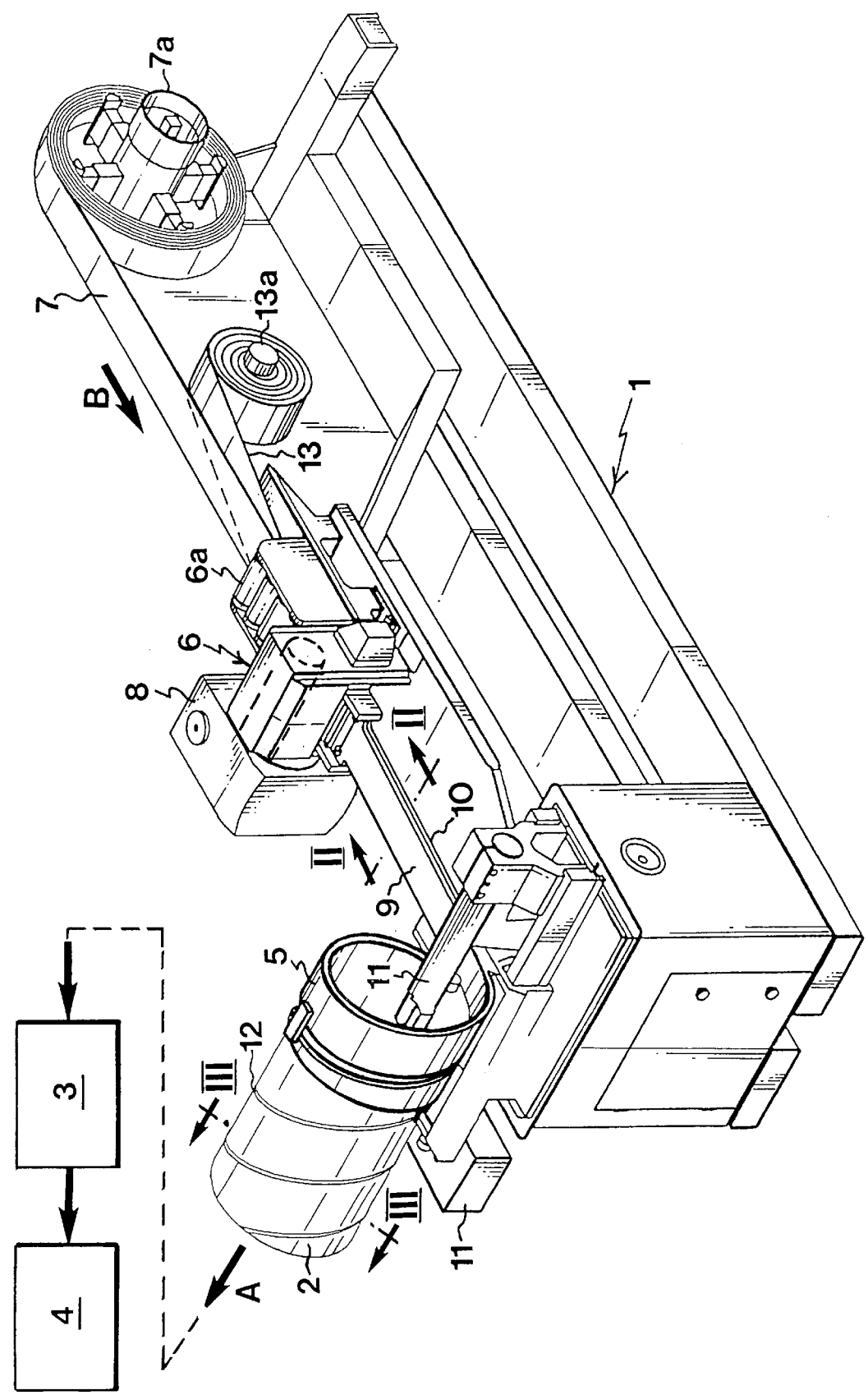
FIG. 1 is a perspective view from above of an arrangement for producing a double-walled structure.

FIG. 1 shows an arrangement for producing a double-walled structure in accordance with a presently preferred embodiment. In the illustrated, non-limitative example, the double-walled structure is a silencer for use in a ventilation duct system (see FIG. 7).

Figure 5:
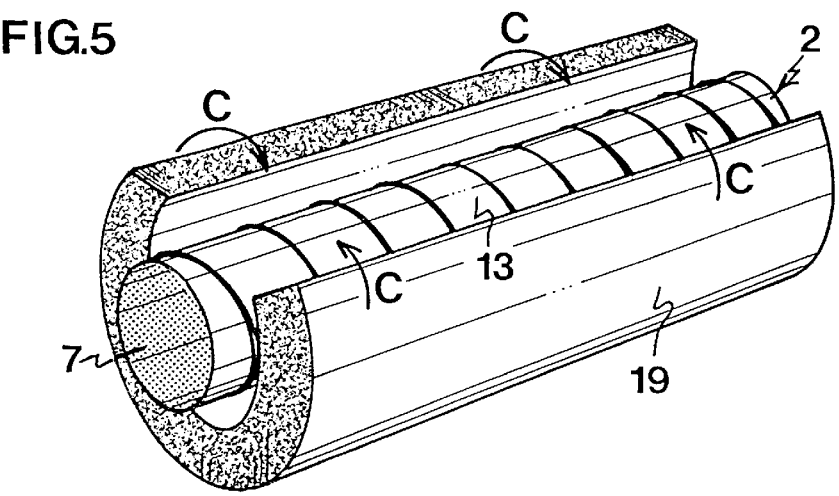
FIG. 5 shows the application of a piece of filler material on the tubing produced in the arrangement shown in FIG. 1.
Figure 6:
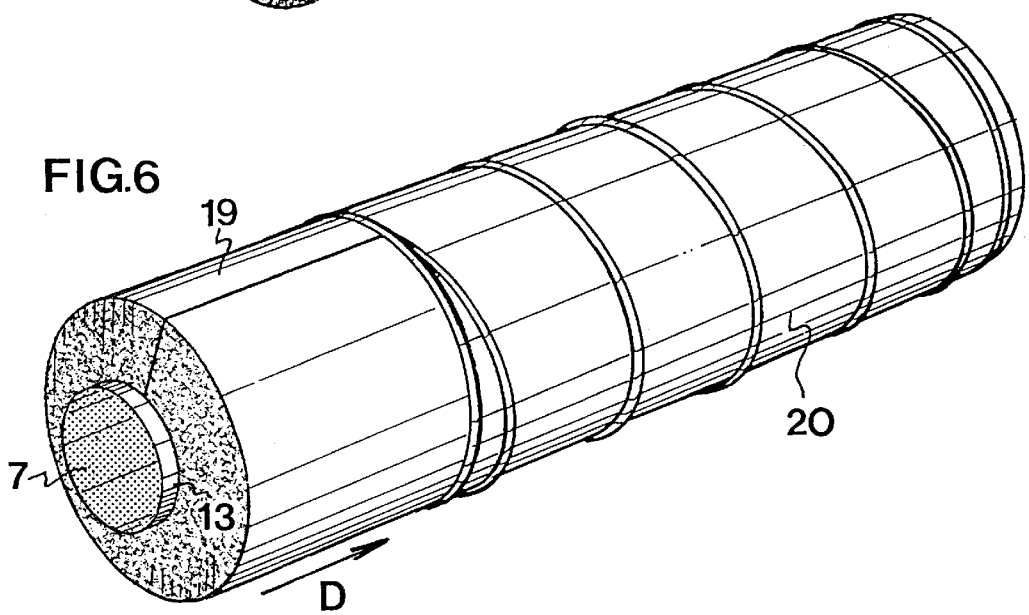
FIG. 6 shows the insertion of the tube assembly in an outer tube.
Figure 7:
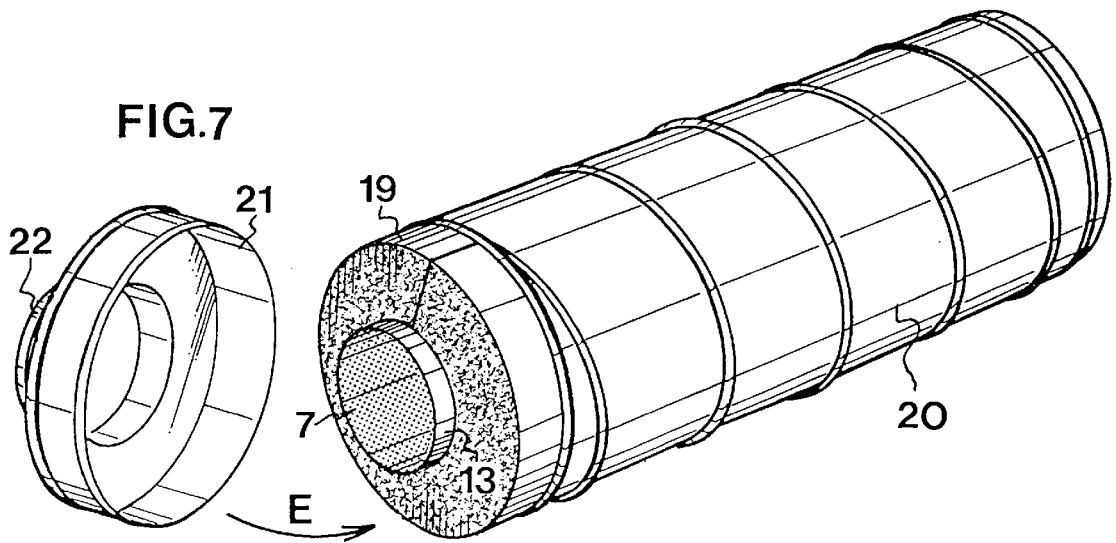
FIG. 7 shows the mounting of an end piece on one end of the double-walled structure.

The arrangement comprises a machine 1 for producing helically-wound lock-seam tubing 2, a schematically shown apparatus 3 for applying filler material, here sound-absorbing material, on the outside of the tubing 2 such that the tubing 2 and the sound-absorbing material form a tube assembly (see FIG. 5), and a schematically shown apparatus 4 for enclosing said tube assembly in a casing (see FIGS. 6–7). The two apparatus 3 and 4 may be of known construction and are therefore not described in detail here.

The machine 1 comprises a forming head 5 for forming the helically-wound lock-seam tubing 2 which is fed out of the forming head 5 (arrow A). Further, the machine 1 has a drive roller assembly 6 for feeding a first strip 7 which is wound on a reel 7a to the forming head 5 (arrow B). The rollers of the drive roller assembly 6 are driven by a drive unit 8. Guiding plates 9 and 10 are provided for guiding the first strip 7 into the forming head 5 (see FIG. 2).

After the forming head 5, a cutting unit 11 is provided for cutting the tubing 2 into suitable, predetermined lengths.

The cutting unit 11 may be of a type known in the art and need not be described in detail here.

The first strip 7 is a perforated metal strip which forms the body of the tubing 2 fed out of the forming head 5 and having a helical lock seam 12.

A second strip 13 wound on a reel 13a is fed to the forming head 5 by means of the drive roller assembly 6. The second strip 13, which in this example is of a flexible, air-permeable material, is applied to that side of the perforated metal strip 7 which forms the outside of the tube body. Thus, the two strips 7 and 13 are joined in the drive roller assembly 6 and fed together as a composite strip into the forming head 5, in which this composite strip is helically formed into the tubing 2. It is preferred that the two strips 7 and 13 have substantially the same width. In an embodiment which in practice has shown excellent results, the air-permeable strip 13 is a cloth material, preferably a polymer material, and the metal strip 7 is of thin metal sheet.

Figure 2:
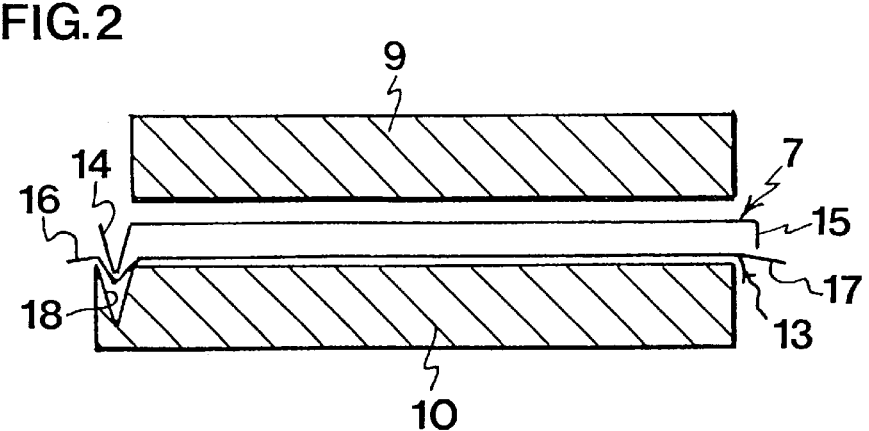
FIG. 2 is a cross-section along the line II—II in FIG. 1 showing a metal strip, a cloth strip and guiding plates.

FIG. 2 illustrates the two guiding plates 9 and 10 and the two strips 7 and 13 (the plates and strips being shown somewhat spaced apart for clarity reasons). Before the drive roller assembly 6, the two longitudinal edge portions 14 and 15 of the metal strip 7 are edge-formed as shown in FIG. 2 by means of edge-forming rollers 6a (see FIG. 1). This forming of the edge portions 14 and 15 is carried out in order to obtain a secure lock seam 12 of the tubing 2. The cloth strip 13, which has longitudinal edge portions 16 and 17, is held on the upper surface of the lower guiding plate 10. As is shown in FIG. 2, the lower guiding plate 10 has a V-shaped groove 18, which corresponds to the V-shaped edge portion 14 of the metal strip 7. The guiding plates 9 and 10 serve to guide the two strips 7 and 13 applied together in a secure manner into the forming head 5.

Figure 3:
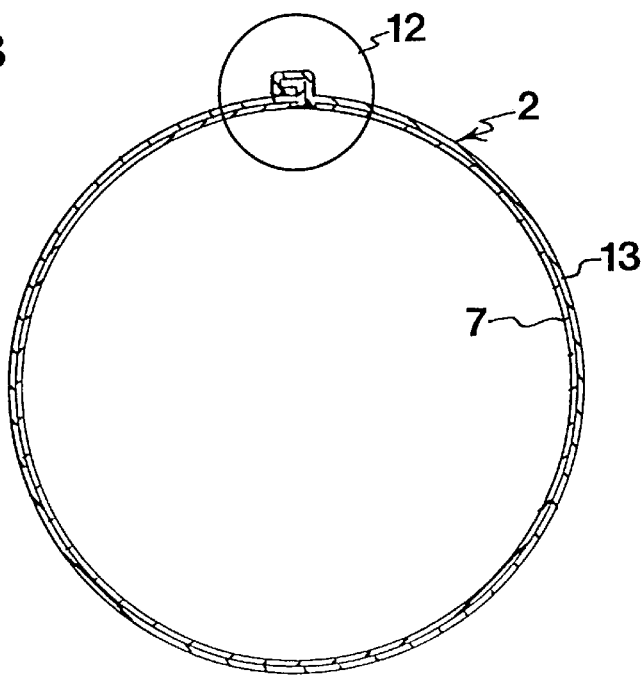
FIG. 3 is a cross-section of a tubing fed out of a forming head, along the line III—III in FIG. 1.

FIG. 3 shows a cross-section of the tubing 2 after the forming head 5. The two strips 7 and 13 are helically wound together, and the cloth strip 13 tightly covers the perforations of the metal strip 7 forming the body of the tubing 2.

Figure 4:
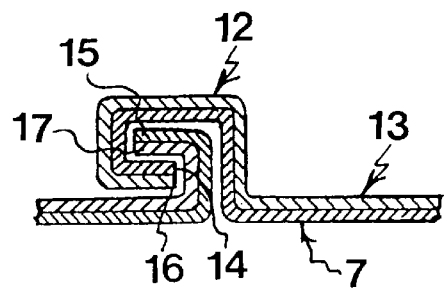
FIG. 4 is a detail of FIG. 3 showing on a larger scale a cross-section of a lock seam of the tube.

A cross-section of the lock seam 12 of FIG. 3 is shown in detail in FIG. 4. For clarity reasons, the two bent edge portions of the tube wall of the lock seam 12 are shown at a small distance from each other in FIG. 4. In practice, these tube edge wall portions are clinched together in order to obtain a secure lock seam 12. It is, however, clear from FIG. 4 that the edge portions 16 and 17 of the cloth strip 13 are lock-seamed together with the edge portions 14 and 15 of the metal strip 7 such that the edge portions 16 and 17 of the cloth strip 13 are securely fastened in the helical lock seam 12 of the tubing 2.

The tubing 2 fed out of the forming head 5 is adapted to form the inner tube of a silencer for use in a ventilation duct system. The final steps for producing the silencer are shown in FIGS. 5–7.

FIG. 5 shows how a rectangular piece 19 of a filler or sound-absorbing material, preferably wool, is swept around the tubing 2 (arrows C) consisting of a perforated inner tube body formed of the metal strip 7 and covered by an air-permeable layer formed by the cloth strip 13. The wool piece 19 is applied on the outside of the tubing 2, and this tube assembly 2, 19 is inserted in a tubular casing 20 coaxial with the inner tube (see FIG. 6, arrow D).

Preferably, the casing 20 is a helically wound lock-seam tube formed from a strip of thin metal sheet. FIG. 7 shows how an end piece 21 is mounted on one end of the casing 20 (arrow E). The casing 20 is provided with one end piece 21 at each end. Each end piece 21 has a tubular portion 22 for connection to circular ducts (not shown) in a ventilation duct system. After mounting of the two end pieces 21, which are optional, the manufacturing of the aimed-at double-walled silencer is finished. In the double-walled structure achieved, the inner tube 2 is a first wall and the outer tube 20 is a second wall.

It should be noted that the shape of the casing 20 is not crucial; it may alternatively have other forms and cross-sections, such as elliptic, rectangular, etc.

Briefly, the double-walled structure is manufactured as follows.

The perforated metal strip 7 is fed to the forming head 5 together with the cloth strip 13 applied to that side of the metal strip 7 which forms the outside surface of the tube body. The two strips 7 and 13 are helically wound as a composite strip in the forming head 5, and the edge portions 16 and 17 of the cloth strip 13 are securely fastened in the helical lock seam 12. The tubing 2 consisting of the perforated, helically wound strip 7 covered by the likewise helically wound cloth strip 13 is cut in a suitable length corresponding to the aimed-at silencer. In the apparatus 3, the sound-absorbing material 19 is applied to the outside surface of the tube 2, and finally the tube assembly 2, 19 consisting of the helically wound tubing 2 and the sound-absorbing material 19 applied thereon is inserted in the tubular casing 20. Optionally, the casing 20 is closed by two end pieces 21.

Figure 8:
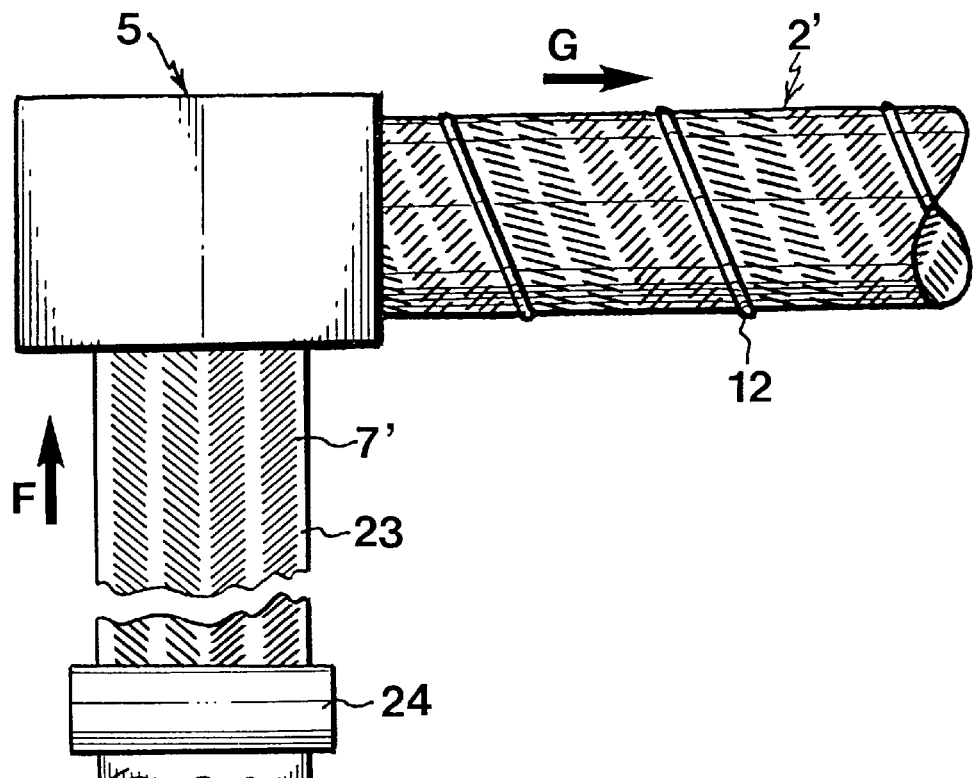
FIG. 8 is a top plan view of a forming head for forming an expanded-metal tube.
Figure 9:
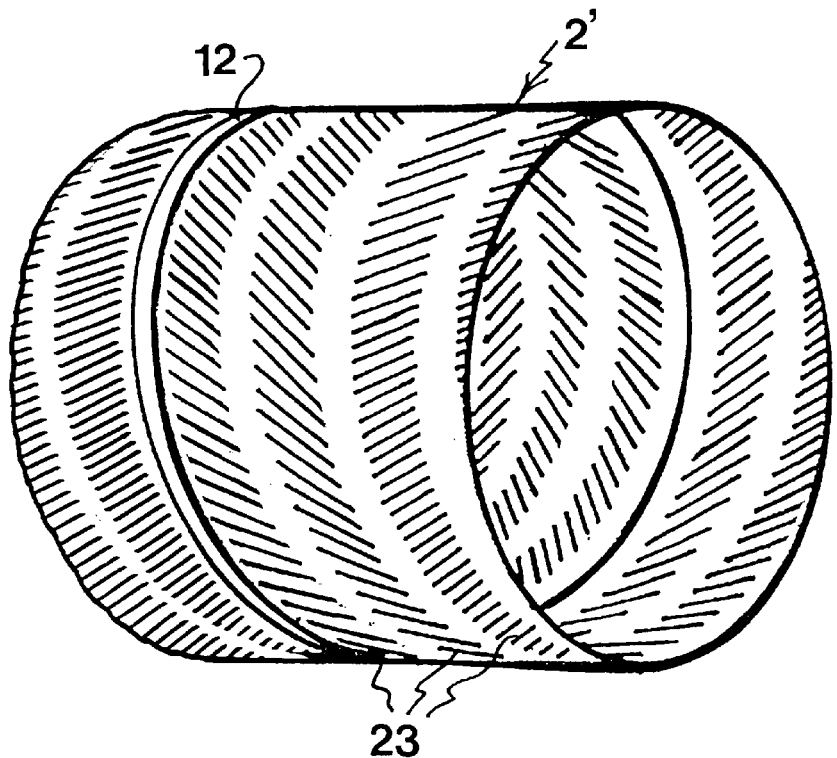
FIG. 9 is a perspective view of a cut portion of a tube shown in FIG. 8.

FIGS. 8–9 show a modified tube 2' for use as an inner tube of a double-walled structure of the present invention, preferably a silencer for use in a ventilation duct system. In this case, the perforations of the tube 2' are formed as longitudinal, parallel areas 23 of expanded metal which are schematically shown. The term expanded metal is well known, see for instance U.S. Pat. No. 4,034,826 mentioned by way of introduction.

Thus the flat sheet metal strip 7 is fed to a schematically shown apparatus 24 for forming the expanded-metal areas 23, and then the partially perforated metal strip 7' is fed to the schematically shown forming head 5 (arrow F), in which it is helically wound into a tube 2' having a helical lock seam 12, as described above (arrow G).

The expanded-metal tube 2' is then cut off and fed to the apparatus 3 and 4 (FIG. 1) for completing the double-walled structure. The tube 2' is enclosed by a sound-absorbing material 19 and by an outer tube 20, as is the perforated tube 2 shown in FIGS. 5–7.

The tube 2' may have several parallel areas 23 of expanded metal separated by non-machined, longitudinal areas of the metal strip 7. The apparatus 24 may have various rollers (not shown) for providing the indicated expanded-metal areas 23. In an embodiment, the entire strip 7' consists of expanded metal. Preferably, the expanded-metal areas 23 are continuous and extend throughout the entire length of the strip.

By forming the helically-wound lock-seam tube 2' with expanded-metal areas 23, several advantages are achieved. Material savings are obtained, since the sheet metal strip 7 used may have a smaller width than in an alternative production in which perforations are punched in the strip 7 before being fed to the tube former. Scrap is kept at a minimum. Further, the stiffness of the tube 2' is enhanced.

Surprisingly, it has also been found that a double-walled silencer made in accordance with the invention, thus having an expanded-metal inner tube, has a better sound-absorbing function than standard silencers. The sound-absorbing effect is enhanced on the order of 3–5 dB in the frequency range 0–1000 Hz.

In an embodiment, the expanded metal tube 2' is covered by an air-permeable cover 13 as described above.

Finally, it should be pointed out that the inventive concept is by no means restricted to the embodiments described herein, but several modifications are feasible within the scope of the appended claims. In particular, it should be mentioned that the production of the double-walled structure may be carried out either in line, in which case the machine 1 and the two apparatus 3 and 4 are arranged in line, or in separate stations. In the latter case, lengths of tubing 2 are put in an intermediate supply before providing the sound-absorbing material 19 on the tubing 2 and before insertion of the tube assembly 2, 19 in the outer tube or casing 20. The filler material to be applied on the tubing fed out of the forming head can either be applied in the shape of a rectangular piece which is swept around the tubing, or applied in the shape of a strip which is helically wound on the outside of the tubing (not shown). Of course, there are other alternatives for applying the filler material.

What we claim and desire to secure by Letters Patent is:

1. A double-walled structure in a ventilation duct system, comprising:
    an inner tube;
    an outer casing spaced from and enclosing said inner tube; and
    a sound-absorbing material provided between said inner tube and said casing;
    wherein said inner tube is a helically-wound lock-seam tube formed from a sheet metal strip having at least one longitudinal area of expanded metal.

2. The structure of claim 1, wherein said sheet metal strip has several parallel longitudinal areas of expanded metal.

3. The structure of claim 1, wherein a fluid-permeable cover is applied to and tightly covers the outside of said inner tube.

4. The structure of claim 3, wherein said fluid-permeable cover is formed from a further strip helically wound together with said sheet metal strip.

5. The structure of claim 4, wherein said further strip has longitudinal edge portions secured in the helically wound lock seam of said inner tube.

6. The structure of claim 4, wherein said sheet metal strip and said further strip have substantially the same width.

7. The structure of claim 3, wherein said fluid-permeable cover is of a cloth material.

8. The structure of claim 7, wherein said cloth material is a polymer material.

9. The structure of claim 1, wherein said outer casing is a tube coaxial with said inner tube.

10. The structure of claim 9, wherein said outer tube is a helically-wound lock-seam tube.

11. The structure of claim 1, wherein said sound-absorbing material fills up the space between said inner tube and said outer casing.

12. The structure of claim 1, wherein said sound-absorbing material is mineral wool.

13. A double-walled silencer for use in a ventilation duct system, comprising:
    an inner tube;
    an outer tube spaced from and enclosing said inner tube;
    a tubular space defined by said inner tube and said outer tube; and
    a sound-absorbing material provided in and filling up said space between said inner tube and said outer tube;
    wherein said inner tube is a helically-wound lock-seam tube formed from a sheet metal strip having at least one longitudinal area of expanded metal.

14. The silencer of claim 13, further comprising an air-permeable cover of a cloth material applied to the outside of said inner tube and tightly covering said inner tube; wherein said cloth cover is formed from a further strip helically wound together with said sheet metal strip and having its longitudinal edge portions secured in the helically wound lock seam and said inner tube.

15. A sheet metal strip having at least one longitudinal area of expanded metal, adapted for producing a helically-wound lock-seam tube as an inner tube in a double-walled structure in a ventilation duct system, and preferably acting as a silencer.

* * * * *